April 8, 1969 C. R. RICE 3,437,025

MOLDED PLASTIC BELLOWS

Filed Feb. 7, 1966 Sheet 1 of 2

INVENTOR.
Christopher R. Rice
BY Brown and Mikulka
and
Charles S. McGuire
ATTORNEYS April 8, 1969

C. R. RICE 3,437,025

MOLDED PLASTIC BELLOWS

Filed Feb. 7, 1966

INVENTOR.
Christopher R. Rice
BY Brown and Mikulka
and
Charles S. McGuire
ATTORNEYS

United States Patent Office 3,437,025
Patented Apr. 8, 1969

3,437,025
MOLDED PLASTIC BELLOWS
Christopher R. Rice, Wakefield, Mass., assignor to Polaroid Corporation, Cambridge, Mass., a corporation of Delaware
Filed Feb. 7, 1966, Ser. No. 525,664
Int. Cl. G03b 17/04
U.S. Cl. 95—39     5 Claims This invention relates to photography and, more particularly, to novel constructions of camera bellows, and the like, and to novel methods and apparatus for effecting such bellows constructions.

In the usual folding type camera a protected light path is provided between the objective lens and film plane by an expansible and collapsible bellows. The flexible nature of the bellows permits easy adjustment of the lens relative to the film plane for focusing and other optical purposes. Also, the bellows may be completely collapsed to a substantially flat position to allow movement of the lens into proximity with the camera body, thereby providing a much more compact device in the folded position to facilitate handling, transport, and storage. The bellows is normally attached in light-tight engagement at its front and rear ends, respectively, with the lens board or shutter housing and the camera body.

Copending U.S. patent application Ser. No. 395,402, filed Sept. 10, 1964, of Edison R. Brandt and assigned to applicant's assignee, discloses a novel camera bellows fabricated by heating and reforming the bellows material, rather than by cutting and folding according to previous, conventional techniques. One of the principal advantages of a satisfactory bellows fabricated from thermoplastic materials by molding techniques is the significant economy realized by the speed and repeatability of such methods of manufacture. The present invention is also concerned with camera bellows molded from materials such as plastics and having certain additional improvements and refinements not found in the prior art, including the molded bellows disclosed in the aforementioned copending application. For example, it is often desirable to provide tabs, or the like, affixed to portions of the bellows and having openings therein to serve as guides for flexible cords or cables extending between the camera body and the shutter housing. Such tabs are normally provided by cutting and forming the tabs individually and then attaching them by cementing, or other convenient means, to the proper portions of the finished bellows. Although similar tabs could be applied in like manner to molded plastic bellows, a number of separate and additional operations may be eliminated by molding the tabs integrally with the walls of the bellows. It is a principal object of the present invention to provide such a bellows, as well as suitable methods and apparatus for the fabrication thereof.

Other objects of the invention will in part be obvious and will in part appear hereinafter.

The invention accordingly comprises the article of manufacture possessing the features, properties and the relation of components, and the process and apparatus for the fabrication of said article which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
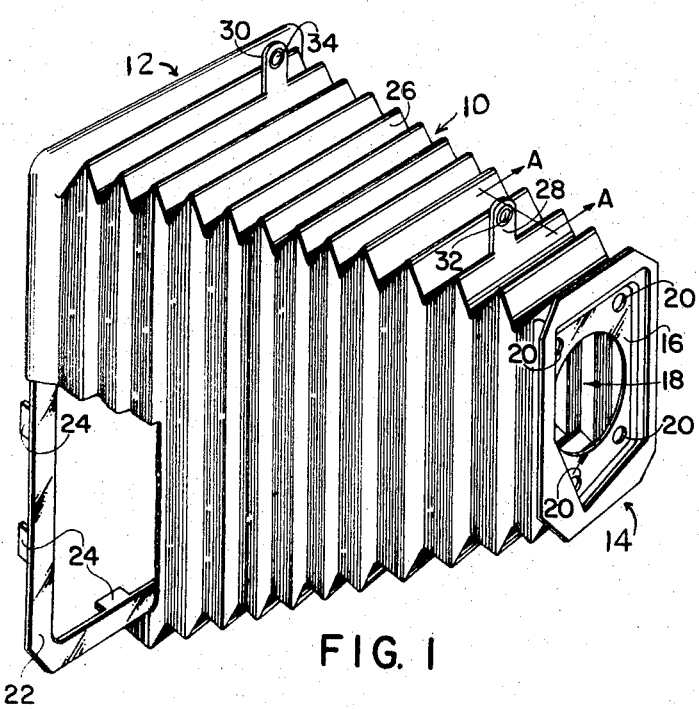
FIGURE 1 is a perspective view of a camera bellows constructed according to the present invention, with portions broken away.

Referring now to the drawing, in FIGURE 1 is shown an example of a completed camera bellows constructed according to the present invention. The bellows is designated generally by the reference numeral 10, and includes four sides generally converging from one end 12 to the other 14. End 12 is hereafter referred to as the rear of the bellows since it is designed to be attached to the camera body around the exposure opening wherein the photosensitive material is placed for exposure. End 14 is termed the front end since it is designed to be attached to forward elements of the camera such as the lens board or shutter housing. The four sides of the bellows are arranged to have a rectangular cross section so that the bellows shape is that of a truncated pyramid. Each wall is formed with a plurality of pleat or fold lines extending in parallel relation along the sides transverse to the major axis running through the bellows from front to rear. These fold lines are cooperatively arranged along each of the sides so that the bellows may be moved from the extended position shown in FIGURE 1 to a collapsed position wherein each of the walls are folded along their respective fold lines into an essentially flat position. This configuration and manner of folding and extending the bellows is conventional and common to virtually all well-known camera bellows.

Bellows 10 further includes front plate or frame 16 having therein large, centrally disposed opening 18 for the passage of light to the film upon operation of the camera shutter, and a plurality of small openings 20 through which rivets or screws may be inserted to secure the front of the bellows to the lens board or shutter housing. Rectangular rear frame 22 is inserted in rear end 12 of bellows 10 and includes tabs 24 around the periphery thereof which may be bent over to secure the rear of the bellows to the appropriate portions of the camera body. Front and rear frames 16 and 22 also commonly provided in conventional camera bellows for the purposes indicated and are constructed of metal or some other suitable, rigid material to impart the desired rigidity to the front and rear of the bellows. Although rear frame 22 may be inserted in the rearmost convolution of the bellows after the latter has been otherwise completed, front frame 16 is incorporated in the bellows structure during formation of the wall portions thereof in accordance with the construction of the present invention as explained hereinafter.

Figure 1A:
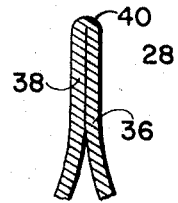
FIGS. 1A and 1B are fragmentary, enlarged, side sectional views of portions of the bellows on the line A—A of FIGURE 1.
Figure 1B:
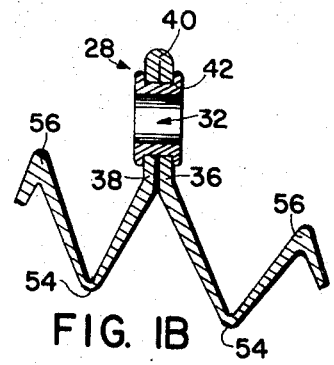

Wall 26 of bellows 10 also includes, as an integral part thereof and extending outwardly therefrom, a pair of ears or tabs 28 and 30 having holes 32 and 34, respectively, therein. These are provided for the purpose of serving as guides or supports for a flexible cable or similar operating element extending the length of the expanded or collapsed bellows between the camera body and shutter housing; such cables are commonly provided for the purpose of transmitting mechnical movement to a shutter release button on the camera body to an appropriate latch within the shutter mechanism, for serving as an electrical conductor between a battery in the camera body and electrical flash contacts within the shutter, etc. Bellows 10 is formed from an essentially flat sheet of a thermoplastic material by heating and reforming the material on suitable molding apparatus as described later. Tabs 28 and 30 are likewise formed by molding the material to the desired shape over similarly shaped tabs associated with the molding apparatus. Accordingly, tabs 28 and 30 are hollow, as indicated in the sectional view of FIG. 1A which shows tab 28 before formation of the opening therein. The tab thus includes two opposing wall portions 36 and 38 which are joined around the peripheries, as indicated at 40. The tab is shown in FIG. 1B after opening 32 has been formed. Metal eyelet 42 is inserted through the opening in tab 28 and pressed into close engagement with walls 36 and 38 so that no light can enter the interior of bellows 10 through opening 32 and between walls 36 and 38.

Figure 2:
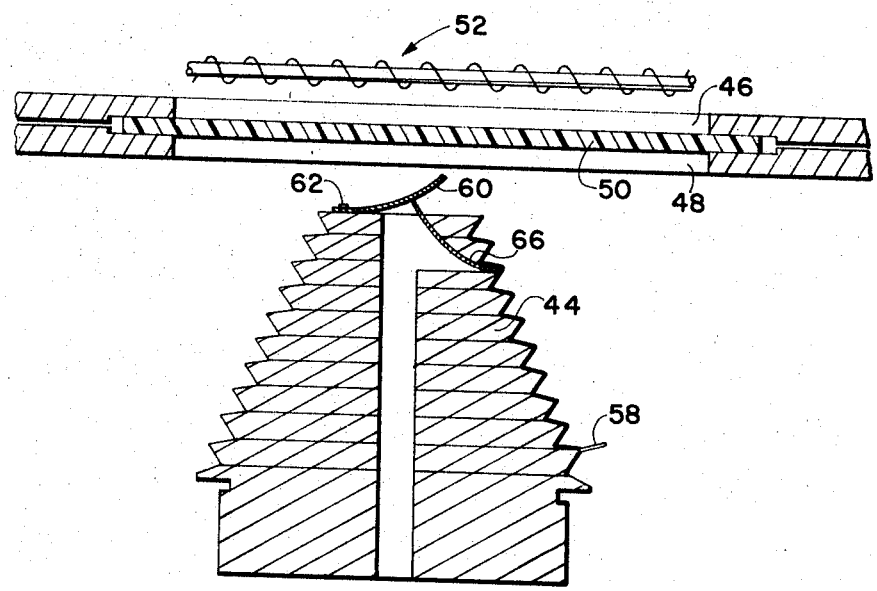
FIG. 2 is an elevational view, of a suitable embodiment of molding apparatus for forming the bellows of FIGURE 1, with certain movable portions shown in a first position.

In FIG. 2 is illustrated an example of molding apparatus designed to form the bellows of the invention. The apparatus includes a male mold member 44 having an outer surface comprising four sides generally converging from the lower to the upper part of the mold member, and a succession of undercut portions, whereby the surface of the mold conforms to the desired finished shape of the bellows. A suitable platen having relatively movable upper and lower sections 46 and 48 respectively, is provided in axially movable relation to mold member 44. Platen sections 46 and 48 are adapted to engage therebetween a substantially flat sheet 50 of a thermoplastic material along marginal edge portions thereof. While sheet 50 is held in spaced relation to mold member 44, a sufficient amount of heat is applied thereto, by any appropriate heating means such as the electrical resistance heater indicated diagrammatically by the reference numeral 52, to render the thermoplastic material readily deformable. While sheet 50 is in the deformable state, the platen is moved relative to the mold member so that the material of sheet 50 is deformed to cover the outer surface of the mold member. A vacuum is then applied through internal openings in mold member 44 communicating with the outer surface thereof, whereby sheet 50 is drawn into close contact with the outer surface and conforms to the shape of the mold. As explained in previously mentioned patent application Ser. No. 395,402, forming the material on a male mold member produces a thinner wall of the material in the undercut portions of the mold. This is illustrated in the fragment of wall 26 shown in FIG 1B, wherein the wall thickness at 54, which is formed in an undercut portion of the mold, is seen to be thinner than the wall at 56. This permits molded plastic bellows to be folded to a collapsed position which is essentially flat, which would not be the case if the walls were of uniform thickness or if the thick portion of the wall appeared at the undercut portions of the mold.

Also associated with and forming a part of the molding apparatus are tab 58 and flexible arm 60, attached by means of rivet 62 to the upper surface of mold member 44. Tab 58 is fixedly attached to the mold member by any convenient means such as being wedged in a recess provided for this purpose, and is made of a material which is capable of being flexed in a direction toward the upper end of the mold member. Arm 60 is made of a suitable material, such as a relatively thin sheet metal stock, which is formed to have a normal position such as that shown in FIG. 2, with the free end of the arm spaced from the top surface of the mold member. The free end of arm 60 is movable from the position of FIG. 2 into contact with the upper surface of mold member 44. Fixedly secured to arm 60 at a movable poriton thereof is a second flexible arm 64 which extends through a suitable channel within mold member 44 and terminates in free end portion 66. When arm 60 is in its free position, as shown in FIG. 2, end portion 66 extends to a position substantially flush with the outer surface of mold member 44.

Figure 3:
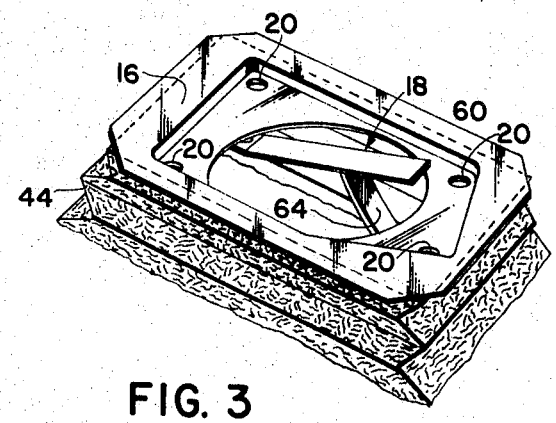
FIG. 3 is a fragmentary, perspective view of a portion of the apparatus of FIG. 2, shown with an element of the bellows placed thereon.
Figure 4:
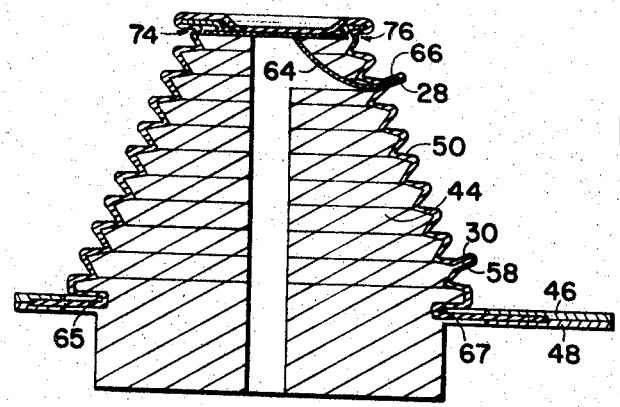
FIG. 4 is a sectional view, as in FIG. 2, showing the movable portions of the molding apparatus in a second position and the material of the bellows formed thereon.

Prior to deforming sheet 50 over mold member 44, front frame 16 is placed on the upper surface of the mold with the free end of arm 60 extending through opening 18, as shown in FIG. 3. Front frame 16 is so dimensioned relative to the boundary of the upper surface of mold member 44 that the edges of the frame extend somewhat beyond the outer periphery of the mold. As sheet 50 is deformed over mold member 44, it will, of course, cover front frame 16 and contact arm 60. When the vaccum is applied to draw sheet 50 into close contact with the mold, the portion of sheet 50 which extends across the top of the mold, in covering relation to frame 16, will cause arm 60 to be flexed to a position parallel with the upper surface of the mold member. This movement of arm 60 will move end portion 66 of arm 64 past the outer surface of mold member 44. Thus, end portion 66 will protrude and cause a portion of sheet 50 to be deformed away from the outer surface of the mold. Tab 28 is formed in this manner, which insures that wall 26 will not be too thin in the area on the lower side of end portion 66, which could be the case if an extending tab were permanently affixed to the mold member in this position. FIG. 4 illustrates the positions of the various elements of the molding apparatus and sheet 50 after the bellows has been formed and is ready to be stripped from the mold.

The excess material at the base of the mold may be trimmed away prior to removal of the bellows therefrom. A suitable cutting tool is moved along the four sides of the bellows in the lowest undercut portion of the mold, having a horizontally disposed wall, as opposed to the angular walls of the other undercut portions, i.e., the portions indicated in FIG. 4 by the reference numerals 65 and 67. Thus, the rear of the bellows will be provided with marginal edge portions lying in a plane substantially normal to the major axis of the bellows and a suitable convolution for insertion of rear frame 22 is provided. The excess portion trimmed from the main body of the bellows is removed from the mold and discarded.

Figure 5:
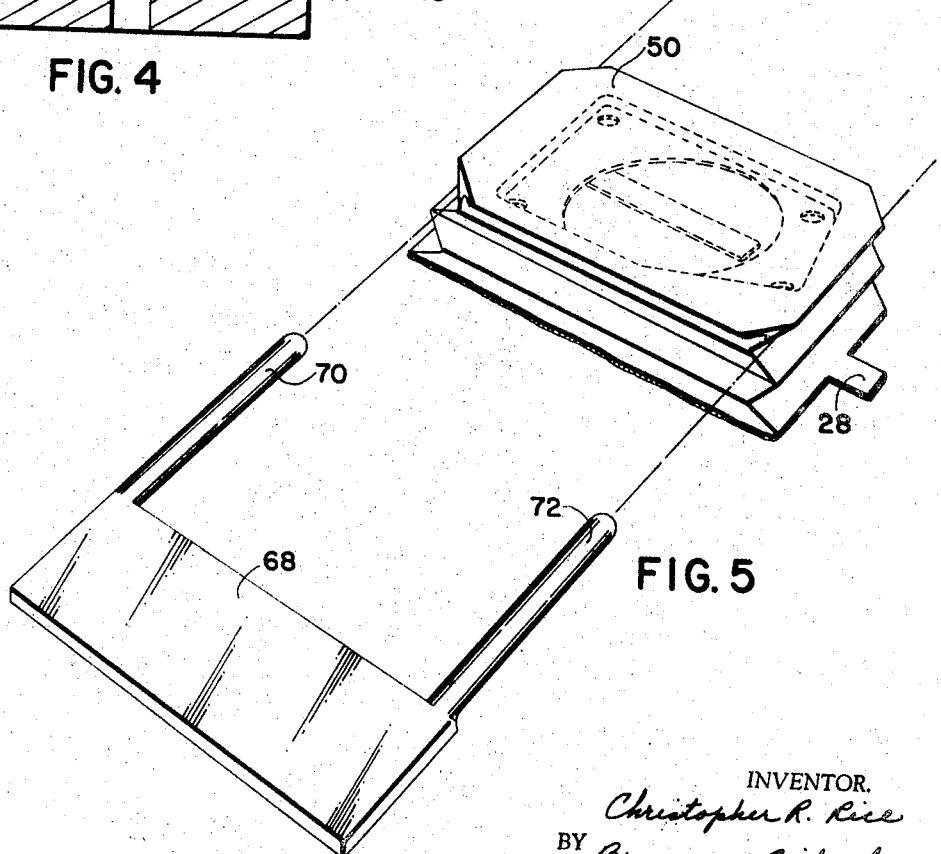
FIG. 5 illustrates a preferred means of stripping the bellows from the mold.

Referring now to FIG. 5, there is shown a fragment of the top of the bellows in covering relation to the mold member, and a movable plate 68 having a pair of fingers 70 and 72 extending therefrom in the direction of the mold. Suitable means (not shown) are provided for moving plate 68 toward and away from mold member 44 with fingers 70 and 72 moving in parallel relation to the upper surface of the mold member. The space between the inside edges of fingers 70 and 72 is somewhat less than the length of one side of the front end of the bellows. Fingers 70 and 72 are moved to engage the sides of the bellows behind the front plate and above the top of mold member 44. That is, the fingers are inserted along the areas indicated in FIG. 4 by the reference numerals 74 and 76. After the material of sheet 50 has been allowed to cool sufficiently to set in the form of the mold and trimmed around the rear edges as previously indicated, fingers 70 and 72 are inserted as indicated and lifted upwardly, away from the mold, the vacuum having been previously released. In addition, the same means used to apply the vacuum may be reversed to provide the positive air pressure through the openings in the mold, thereby forcing the bellows material away from the mold. As the bellows is pulled upwardly, tab 58 is flexed in this direction so that it is removed from within tab 30 which has been formed thereby on the bellows. Movement of the bellows allows arm 60 to return to its position of FIG. 2 thereby withdrawing end portion 66 from within tab 28 of the bellows. End portion 66 is also preferably constructed of a flexible material similar to that of tab 58 to allow for any necessary upward movement of the end portion prior to compelte retraction thereof within mold member 44. After removal of the bellows from the mold, the portion of sheet 50 which covers the central, recessed portion of frame 16 is trimmed away by a suitable cutting die.

Other features of the molded plastic bellows and method of fabrication thereof set forth in copending application Ser. No. 395,402 are also preferably incorporated into the bellows and method of the present invention. For example, the exterior surface of the mold should be textured, as by having a wrinkle paint finish, to provide a flat, nonreflective, internal surface on the finished bellows. Also, to insure proper folding and unfolding along the lines molded into the bellows, an additional heat treatment may be provided by holding the bellows in the properly folded position, heating to 150°–170° F. and returning to room temperature, which may be accelerated by quenching with cold water, while held in this position. The material from which the bellows is formed should be a plastic of low flexural modulus, on the order of 5,000–7,000 p.s.i., suitable examples being: Ultrathene UE 630X (ethylene vinyl acetate copolymer by U.S. Industrial Chemicals) and Zetafin 35 (ethylene acrylonitrile copolymer by Dow Chemical). Forming the bellows of such a material allows easy stripping thereof from the mold, including the tab portions, without damage. The surface of sheet 50 which contacts the outer surface of the mold should be coated with a release agent, such as a conventional silicone lubricant, or may contain a calcium carbonate additive for anti-blocking. The preferred material for tab 58 and for end portion 66 in Teflon having a thickness of approximately .020 inch.

From the foregoing detailed explanation, it may readily be seen how camera bellows, movable between expanded and collapsed positions, with flexible tabs extending from a wall portion thereof may be quickly and economically fabricated from inexpensive materials. The unique molding apparatus having portions extending outwardly from the molding surface and flexible in the direction of stripping of the material from the mold makes possible the formation of the bellows and removal thereof from the mold without damaging effects to either the finished bellows or the molding apparatus. The flexible tabs formed on the bellows according to the present invention, although formed as an integral part of the bellows, are in all respects functionally equivalent to similar tabs placed on conventional camera bellows as a separately formed element and as an additional operation in the fabrication of such bellows.

Since certain changes may be made in the above article, process and apparatus without departing from the scope of the invention herein involved, it is intended that all matter contained in the above description or shown in the accompanying drawings shall be interpreted as illustrative and not in a limiting sense.

What is claimed is:
1. An expansible and collapsible bellows for use on a photographic camera or the like, said camera or the like having an operating element which extends the length of the bellows whether in expanded or collapsed positions, said bellows comprising a single, continuous sheet of thermoplastic material defining a space enclosed by wall portions having a series of convolutions formed by fold lines molded into said material perpendicular to the major axis thereof, and at least one substantially flat, flexible tab, formed from said material as an integral portion of said bellows, extending from an anchored position on said wall portion intermediate the ends thereof, said tab forming an integral projection extending outwardly from said wall portion for coacting in a supporting manner with said operating element as said bellows is expanded and collapsed.

2. The invention according to claim 1 wherein the flexural modulus of said material is such that the latter may be suplied as an initially flat sheet, heated and reformed on a male mold to form said wall portion and tab, and stripped over said male mold without deleterious effects.

3. The invention according to claim 2 wherein said wall portion includes four sides joined together to have a substantially rectangular cross section, said sides converging from one end of said bellows toward the other whereby said bellows has a generally pyramidal shape in the expanded position, and said tab extends outwardly from one of said sides.

4. The invention according to claim 3 wherein said tab is formed by molding said material over a similarly shaped, flexible member associated with said mold, whereby said tab includes two flat, opposing strips, each joined to said one of said sides and to one another around the peripheries thereof.

5. The invention according to claim 4 wherein a plurality of said tabs extend outwardly from said one of said sides and are spaced from one another along the major axis of said bellows.

References Cited
UNITED STATES PATENTS

| | | | |
|---|---|---|---|
| 1,382,081 | 6/1921 | Heiliger | 29—454 |
| 1,500,391 | 7/1924 | Hutchings | 95—39 |

JOHN M. HORAN, *Primary Examiner.*